US012674116B2

(12) United States Patent
Muro et al.

(10) Patent No.: US 12,674,116 B2
(45) Date of Patent: *Jul. 7, 2026

(54) CLEANING COMPOSITION, CLEANING METHOD OF SEMICONDUCTOR SUBSTRATE, AND MANUFACTURING METHOD OF SEMICONDUCTOR ELEMENT

(71) Applicant: FUJIFILM Corporation, Tokyo (JP)

(72) Inventors: Naotsugu Muro, Haibara-gun (JP); Tadashi Inaba, Haibara-gun (JP); Tetsuya Kamimura, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 310 days.

This patent is subject to a terminal disclaimer.

(21) Appl. No.: 18/492,224

(22) Filed: Oct. 23, 2023

(65) Prior Publication Data

US 2024/0067901 A1 Feb. 29, 2024

Related U.S. Application Data

(63) Continuation of application No. PCT/JP2022/022886, filed on Jun. 7, 2022.

(30) Foreign Application Priority Data

Jun. 14, 2021 (JP) ................................ 2021-098707

(51) Int. Cl.

*C11D 1/22* (2006.01)
*C11D 1/12* (2006.01)
*C11D 3/20* (2006.01)
*C11D 3/34* (2006.01)
*C11D 3/36* (2006.01)

(52) U.S. Cl.

CPC .............. *C11D 3/2082* (2013.01); *C11D 1/12* (2013.01); *C11D 3/3409* (2013.01); *C11D 3/361* (2013.01); *C11D 2111/22* (2024.01)

(58) Field of Classification Search

CPC .......... C11D 1/12; C11D 3/2082; C11D 3/361
USPC ................................ 510/175, 176, 477, 467
See application file for complete search history.

(56) References Cited

U.S. PATENT DOCUMENTS

| | | | |
|---|---|---|---|
| 7,763,577 B1 | 7/2010 | Chang et al. | |
| 2005/0176606 A1 | 8/2005 | Konno et al. | |
| 2011/0136717 A1 | 6/2011 | Tamboli et al. | |
| 2014/0128307 A1* | 5/2014 | Chhabra | C11D 7/267 510/109 |
| 2021/0395645 A1 | 12/2021 | Kamimura et al. | |

FOREIGN PATENT DOCUMENTS

| | | | |
|---|---|---|---|
| EP | 3588535 A1 | 1/2020 | |
| JP | 2005-255983 A | 9/2005 | |
| JP | 2010-090226 A | 4/2010 | |
| JP | 2011-040722 A | 2/2011 | |
| WO | WO-2012154498 A2 * | 11/2012 | H10F 71/121 |
| WO | WO-2013173738 A1 * | 11/2013 | H01L 21/31133 |
| WO | WO-2020195343 A1 * | 10/2020 | C11D 17/0008 |

OTHER PUBLICATIONS

International Preliminary Report on Patentability (with translation of Written Opinion) dated Dec. 14, 2023, issued in International Application No. PCT/JP2022/022886.
International Search Report (PCT/ISA/210) dated Aug. 30, 2022 issued by the International Searching Authority in International Application No. PCT/JP2022/022886.
Written Opinion (PCT/ISA/237) dated Aug. 30, 2022 issued by the International Searching Authority in International Application No. PCT/JP2022/022886.
Communication dated Jun. 19, 2023 issued by the Korean Patent Office in application No. 10-2023-7011284.
Extended European Search Report dated Sep. 17, 2024 from the European Patent Office in Application No. 22824861.3.

* cited by examiner

*Primary Examiner* — Gregory R Delcotto
(74) *Attorney, Agent, or Firm* — Sughrue Mion, PLLC

(57) ABSTRACT

An object of the present invention is to provide a cleaning composition which has excellent removability of a residue (particularly, a residue after CMP) and excellent anticorrosion properties of copper; a cleaning method of a semiconductor substrate; and a manufacturing method of a semiconductor element. The cleaning composition of the present invention contains citric acid, 1-hydroxyethane-1,1-diphosphonic acid, a sulfonic acid-based surfactant, and water, in which a mass ratio of a content of the citric acid to a content of the 1-hydroxyethane-1,1-diphosphonic acid is 20 to 150, a mass ratio of the content of the citric acid to a content of the sulfonic acid-based surfactant is 70 to 1,500, and a pH is 0.10 to 4.00.

19 Claims, No Drawings

CLEANING COMPOSITION, CLEANING METHOD OF SEMICONDUCTOR SUBSTRATE, AND MANUFACTURING METHOD OF SEMICONDUCTOR ELEMENT

CROSS-REFERENCE TO RELATED APPLICATIONS

This application is a Continuation of PCT International Application No. PCT/JP2022/022886 filed on Jun. 7, 2022, which claims priority under 35 U.S.C. § 119(a) to Japanese Patent Application No. 2021-098707 filed on Jun. 14, 2021. The above applications are hereby expressly incorporated by reference, in their entirety, into the present application.

BACKGROUND OF THE INVENTION

1. Field of the Invention

The present invention relates to a cleaning composition.

2. Description of the Related Art

In recent years, in the field of semiconductors, with remarkable increase in integration and performance, even a very small amount of impurities (contamination) or deposits (particles) has a great influence on the performance of an apparatus and eventually the yield of a product. In the field of semiconductors, in order to reduce the influence of contamination and particles in manufacturing, it is common to perform cleaning with a cleaning liquid.

In a semiconductor element, various contaminations and particles (hereinafter, also referred to as residues) may be generated in each manufacturing step. Examples thereof include a residue obtained by a photolithography step or a dry etching step, and a residue obtained by a chemical mechanical polishing (CMP) treatment.

As a cleaning liquid for removing such a residue, for example, JP2005-255983A discloses a cleaning liquid containing organic polymer particles having a crosslinking structure and a surfactant.

SUMMARY OF THE INVENTION

On the other hand, in the semiconductor element, copper (Cu) may be used for wiring line or the like. In cleaning the residue, the copper may be exposed on a surface, and corrosion of the copper by the cleaning liquid may cause a decrease in the yield of the product. Therefore, it is desired that the cleaning liquid is excellent in removability of the residue and that the corrosion of copper does not occur. In particular, there has been the above-described request for a substrate or the like after performing CMP.

In a case where the cleaning liquid (cleaning composition) disclosed in JP2005-255983A is used for cleaning a semiconductor substrate, the present inventors have found that it is difficult to achieve both the removability of the residue and anticorrosion properties of the copper.

Therefore, an object of the present invention is to provide a cleaning composition which has excellent removability of a residue (particularly, a residue after CMP) and excellent anticorrosion properties of copper.

Another object of the present invention is to provide a cleaning method of a semiconductor substrate and a manufacturing method of a semiconductor element.

The present inventor has conducted intensive studies to achieve the above-described objects, and as a result, it has been found that the above-described objects can be achieved by the following configurations.

[1] A cleaning composition comprising:

citric acid;

1-hydroxyethane-1,1-diphosphonic acid;

a sulfonic acid-based surfactant; and water, wherein a mass ratio of a content of the citric acid to a content of the 1-hydroxyethane-1,1-diphosphonic acid is 20 to 150, a mass ratio of the content of the citric acid to a content of the sulfonic acid-based surfactant is 70 to 1,500, and a pH is 0.10 to 4.00.

[2] The cleaning composition according to [1], in which the sulfonic acid-based surfactant includes an alkylbenzene sulfonic acid-based surfactant.

[3] The cleaning composition according to [2], in which the alkylbenzene sulfonic acid-based surfactant includes an alkylbenzene sulfonic acid-based surfactant having an alkyl group having 8 or more carbon atoms.

[4] The cleaning composition according to [2] or [3], in which the alkylbenzene sulfonic acid-based surfactant includes an alkylbenzene sulfonic acid-based surfactant having an alkyl group having 10 to 13 carbon atoms.

[5] The cleaning composition according to any one of [1] to [4], in which the sulfonic acid-based surfactant includes an alkylbenzene sulfonic acid-based surfactant 1 including an alkyl group having 10 carbon atoms, an alkylbenzene sulfonic acid-based surfactant 2 including an alkyl group having 11 carbon atoms, an alkylbenzene sulfonic acid-based surfactant 3 including an alkyl group having 12 carbon atoms, and an alkylbenzene sulfonic acid-based surfactant 4 including an alkyl group having 13 carbon atoms.

[6] The cleaning composition according to [5], in which a content of the alkylbenzene sulfonic acid-based surfactant 2 with respect to a total mass of the alkylbenzene sulfonic acid-based surfactants 1 to 4 is 20% to 50% by mass.

[7] The cleaning composition according to any one of [1] to [6], in which the mass ratio of the content of the citric acid to the content of the 1-hydroxyethane-1,1-diphosphonic acid is 30 to 100.

[8] The cleaning composition according to any one of [1] to [7], in which the mass ratio of the content of the citric acid to the content of the 1-hydroxyethane-1,1-diphosphonic acid is 40 to 80.

[9] The cleaning composition according to any one of [1] to [8], in which the mass ratio of the content of the citric acid to the content of the 1-hydroxyethane-1,1-diphosphonic acid is 50 to 60.

[10] The cleaning composition according to any one of [1] to [9], in which the mass ratio of the content of the citric acid to the content of the sulfonic acid-based surfactant is 200 to 600.

[11] The cleaning composition according to any one of [1] to [10], in which the mass ratio of the content of the citric acid to the content of the sulfonic acid-based surfactant is 300 to 500.

[12] The cleaning composition according to any one of [1] to [11],
in which the mass ratio of the content of the citric acid to the content of the sulfonic acid-based surfactant is 410 to 440.
[13] The cleaning composition according to any one of [1] to [12],
in which the content of the citric acid with respect to a total mass of the cleaning composition is 0.1% to 35.0% by mass.
[14] The cleaning composition according to any one of [1] to [13],
in which the content of the citric acid with respect to a total mass of the cleaning composition is 1.0% to 35.0% by mass.
[15] The cleaning composition according to any one of [1] to [14],
in which the content of the citric acid with respect to a total mass of the cleaning composition is 20.0% to 35.0% by mass.
[16] A cleaning method of a semiconductor substrate, comprising:
cleaning a semiconductor substrate with the cleaning composition according to any one of [1] to [15].
[17] A manufacturing method of a semiconductor element, comprising:
the cleaning method of a semiconductor substrate according to [16].

According to the present invention, it is possible to provide a cleaning composition which has excellent removability of a residue (particularly, a residue after CMP) and excellent anticorrosion properties of copper.

In addition, according to the present invention, it is possible to provide a cleaning method of a semiconductor substrate and a manufacturing method of a semiconductor element.

DESCRIPTION OF THE PREFERRED EMBODIMENTS

Hereinafter, the present invention will be described in detail.

The description of the following configuration requirements is made based on representative embodiments of the present invention in some cases; however, the present invention is not limited to the embodiments.

Hereinafter, the meaning of each description in the present specification will be described.

In the present specification, a numerical range expressed using "to" means a range which includes the preceding and succeeding numerical values of "to" as the lower limit value and the upper limit value.

In the present specification, ppm is an abbreviation for "parts per million" and means $10^{-6}$. In addition, in the present specification, ppb is an abbreviation for "parts per billion" and means $10^{-9}$.

In the present specification, "psi" means pound-force per square inch, where 1 psi=6,894.76 Pa.

The compounds described in the present specification may include, unless otherwise specified, isomers (compounds having the same number of atoms but having different structures), optical isomers, and isotopes thereof. In addition, only one kind or a plurality of kinds of the isomers and the isotopes may be included.

In the present specification, in a case where there are two or more components corresponding to a certain component, "content" of such a component means the total content of the two or more components.

<Cleaning Composition>

The cleaning composition according to the embodiment of the present invention contains citric acid, 1-hydroxyethane-1,1-diphosphonic acid (hereinafter, also referred to as "HEDPO"), a sulfonic acid-based surfactant, and water, in which a mass ratio of a content of the citric acid to a content of the HEDPO is 20 to 150, a mass ratio of the content of the citric acid to a content of the sulfonic acid-based surfactant is 70 to 1,500, and a pH is 0.10 to 4.00.

Although the mechanism is not always clear, since the cleaning composition contains the citric acid and the HEDPO in the specific range of mass ratio, it is presumed that an appropriate dissolving ability is expressed, and since the cleaning composition contains the sulfonic acid-based surfactant and the citric acid in the specific range of mass ratio, it is presumed that removability of a residue is improved. As a result, it is presumed that the cleaning composition according to the embodiment of the present invention is excellent in removability of the residue and excellent in anticorrosion properties of copper.

Hereinafter, components contained in the cleaning composition, properties of the cleaning composition, and preparation of the cleaning composition will be described in detail.

<Components of Cleaning Composition>

The cleaning composition according to the embodiment of the present invention contains citric acid, 1-hydroxyethane-1,1-diphosphonic acid (HEDPO), a sulfonic acid-based surfactant, and water. In addition, the cleaning composition according to the embodiment of the present invention may contain other components described later.

Hereinafter, each component contained in the cleaning composition and a content mass ratio of the components will be described in detail.

(Citric Acid)

The citric acid preferably has a low impurity content, and for example, a semiconductor-grade citric acid is preferable.

From the viewpoint of more excellent removability of the residue and anticorrosion properties of copper, a content of the citric acid with respect to the total mass of the cleaning composition is preferably 0.1% to 35.0% by mass, more preferably 1.0% to 35.0% by mass, and still more preferably 20.0% to 35.0% by mass.

(HEDPO)

The 1-hydroxyethane-1,1-diphosphonic acid (HEDPO) preferably has a low impurity content, and for example, a semiconductor-grade HEDPO is preferable.

A content of the HEDPO with respect to the total mass of the cleaning composition is preferably 0.001% to 5.0% by mass, more preferably 0.01% to 2.0% by mass, still more preferably 0.1% to 1.0% by mass, and particularly preferably 0.4% to 0.8% by mass.

In the cleaning composition, the mass ratio of the content of the citric acid to the content of the HEDPO is 20 to 150. From the viewpoint of more excellent removability of the residue and anticorrosion properties of copper, the above-described mass ratio is preferably 30 to 100, more preferably 40 to 80, and still more preferably 50 to 60.

(Sulfonic Acid-Based Surfactant)

The sulfonic acid-based surfactant is a surfactant including, among a hydrophobic group and a hydrophilic group of the surfactant molecule, a sulfo group in the hydrophilic group.

The hydrophobic group in the sulfonic acid-based surfactant is not particularly limited, and examples thereof include an aliphatic hydrocarbon group, an aromatic hydrocarbon group, and a combination of these groups. The number of carbon atoms in the hydrophobic group is preferably 6 or more and more preferably 10 or more. The upper limit of the number of carbon atoms in the hydrophobic group is not particularly limited, but is preferably 24 or less and more preferably 20 or less.

Examples of the above-described sulfonic acid-based surfactant include alkylaryl sulfonic acid-based surfactants (for example, an alkylbenzene sulfonic acid-based surfactant and an alkylnaphthalene sulfonic acid-based surfactant), alkyldiphenyl ether disulfonic acid-based surfactants, and polyoxyethylene alkyl sulfonic acid ester-based surfactants, and an alkylaryl sulfonic acid-based surfactant is preferable. That is, a sulfonic acid-based surfactant in which the surfactant molecule has an alkyl group and a sulfo group and the surfactant molecule includes an aromatic hydrocarbon ring in the molecule is preferable.

The alkyl group included in the alkylaryl sulfonic acid-based surfactant may be linear or branched, and is preferably branched. The number of carbon atoms in the above-described alkyl group is preferably 8 or more, more preferably 8 to 20, and still more preferably 10 to 13.

Examples of the aromatic hydrocarbon ring included in the alkylaryl sulfonic acid-based surfactant include a benzene ring and a naphthalene ring.

The sulfo group included in the alkylaryl sulfonic acid-based surfactant is preferably directly bonded to the aromatic hydrocarbon ring. The sulfo group may form a salt with a cation.

As the alkylaryl sulfonic acid-based surfactant, a surfactant represented by Formula (A) is preferable.

$$R^a\text{—}Ar^a\text{—}SO_3H \quad (A)$$

In Formula (A), $R^a$ represents an alkyl group having 8 or more carbon atoms. $Ar^a$ represents an arylene group.

A suitable range of the number of carbon atoms in the above-described alkyl group is as described above.

The above-described arylene group may be monocyclic or polycyclic. The number of carbon atoms in the arylene group is preferably 6 to 20 and more preferably 6 to 15.

As the arylene group, a phenylene group or a naphthylene group is preferable.

Preferred examples of the above-described sulfonic acid-based surfactant include an alkylbenzene sulfonic acid-based surfactant. That is, a sulfonic acid-based surfactant in which the surfactant molecule has an alkyl group and a sulfo group and the surfactant molecule includes a benzene ring in the molecule is preferable.

Hereinafter, the alkylbenzene sulfonic acid-based surfactant is also referred to as "ABS".

The alkyl group included in the ABS may be linear or branched, and is preferably branched. The number of carbon atoms in the alkyl group included in the ABS is preferably 8 or more, more preferably 8 to 20, and still more preferably 10 to 13.

Examples of the ABS include aspects in which $Ar^a$ in Formula (A) is a phenylene group.

Examples of the ABS include octylbenzene sulfonic acid, nonylbenzene sulfonic acid, decylbenzene sulfonic acid, undecylbenzene sulfonic acid, dodecylbenzene sulfonic acid, tridecylbenzene sulfonic acid, tetradecylbenzene sulfonic acid, pentadecylbenzene sulfonic acid, hexadecanebenzene sulfonic acid, heptadecanebenzene sulfonic acid, octadecanebenzene sulfonic acid, nonadecanbenzene sulfonic acid, eicosylbenzene sulfonic acid, decyldiphenyloxide disulfonic acid, undecyldiphenyloxide disulfonic acid, dodecyldiphenyloxide disulfonic acid, and tridecyldiphenyloxide disulfonic acid; sodium salts of these acids, potassium salts of these acids, and ammonium salts of these acids. The alkyl group in the ABS mentioned above may be linear or branched, and is preferably branched. In addition, in a case where the alkyl group is branched, a bonding position of the alkyl group with the benzene ring is not particularly limited.

It is also preferable that the above-described sulfonic acid-based surfactant includes an alkylbenzene sulfonic acid-based surfactant 1 including an alkyl group having 10 carbon atoms (hereinafter, also referred to as "ABS1"), an alkylbenzene sulfonic acid-based surfactant 2 including an alkyl group having 11 carbon atoms (hereinafter, also referred to as "ABS2"), an alkylbenzene sulfonic acid-based surfactant 3 including an alkyl group having 12 carbon atoms (hereinafter, also referred to as "ABS3"), and an alkylbenzene sulfonic acid-based surfactant 4 including an alkyl group having 13 carbon atoms (hereinafter, also referred to as "ABS4").

Examples of the ABS1 include aspects in which, in Formula (A), $Ar^a$ is a phenylene group and $R^a$ is an alkyl group having 10 carbon atoms. Examples of the ABS2 include aspects in which, in Formula (A), $Ar^a$ is a phenylene group and $R^a$ is an alkyl group having 11 carbon atoms. Examples of the ABS3 include aspects in which, in Formula (A), $Ar^a$ is a phenylene group and $R^a$ is an alkyl group having 12 carbon atoms. Examples of the ABS4 include aspects in which, in Formula (A), $Ar^a$ is a phenylene group and $R^a$ is an alkyl group having 13 carbon atoms.

A content of the ABS1 with respect to the total mass of ABS's 1 to 4 is not particularly limited, but is preferably 5% to 50% by mass.

A content of the ABS2 with respect to the total mass of ABS's 1 to 4 is not particularly limited, but is preferably 20% to 50% by mass.

A content of the ABS3 with respect to the total mass of ABS's 1 to 4 is not particularly limited, but is preferably 20% to 50% by mass.

A content of the ABS4 with respect to the total mass of ABS's 1 to 4 is not particularly limited, but is preferably 20% to 50% by mass.

A content of the sulfonic acid-based surfactant with respect to the total mass of the cleaning composition is preferably 0.0001% to 1.0% by mass, more preferably 0.001% to 0.8% by mass, still more preferably 0.02% to 0.2% by mass, and particularly preferably 0.05% to 0.1% by mass.

In the cleaning composition, the mass ratio of the content of the citric acid to the content of the sulfonic acid-based surfactant is 70 to 1,500. From the viewpoint of more excellent removability of the residue and anticorrosion properties of copper, the above-described mass ratio is preferably 200 to 600, more preferably 300 to 500, and still more preferably 410 to 440.

In the cleaning composition, a mass ratio of the content of the HEDPO to the content of the sulfonic acid-based surfactant is preferably 0.5 to 30, more preferably 1 to 20, and still more preferably 5 to 10.

(Water)

As the water, water undergone a purification treatment, such as distilled water, deionized water, and ultrapure water, is preferable, and ultrapure water used for manufacturing semiconductors is more preferable.

A content of the water with respect to the total mass of the cleaning composition is preferably 50.00% to 99.99% by mass, more preferably 60.00% to 98.00% by mass, still more preferably 65.00% to 85.00% by mass, and particularly preferably 68.00% to 75.00% by mass.

(Other Components)

Examples of other components which may be contained in the cleaning composition include a metal ion, a phosphate ion, inorganic particles, organic particles, an amine compound, an anticorrosion agent, and a pH adjuster. In addition, a surfactant other than the sulfonic acid-based surfactant may be contained.

The cleaning composition may contain a metal ion.

In a case where the cleaning composition contains a metal ion, examples of a metal element of the metal ion include Fe, Co, Na, Cu, Mg, Mn, Li, Al, Cr, Ni, Zn, Sn, and Ag.

A content of copper ions with respect to the total mass of the cleaning composition is preferably 0.5 ppb by mass or less. The lower limit thereof is not particularly limited, but it is preferable that the copper ions are not detected.

The content of the metal ion can be determined by a known method, and examples thereof include Inductively Coupled Plasma-Mass Spectrometry (ICP-MS). In the present specification, the content of the metal ion is assumed to be obtained by measuring with ICP-MS.

The cleaning composition may contain a phosphate ion. The phosphate ion may be contained as an impurity of each of the above-described components.

In a case where the cleaning composition contains a phosphate ion, a content of the phosphate ion with respect to the total mass of the cleaning composition is preferably 1.0% by mass or less, more preferably 0.1% by mass or less, and still more preferably 0.01% by mass or less.

It is preferable that no phosphate ion is detected in the cleaning composition, but the content of the phosphate ion with respect to the total mass of the cleaning composition is often 0.001% by mass or more.

The phosphate ion can be obtained by a known method, and examples thereof include ion chromatography and a colorimetric method using ammonium molybdate.

Examples of the method of adjusting the above-described content of the phosphate ion include a method of purifying the components contained in the cleaning composition and the cleaning composition after being adjusted by distillation, use of ion exchange resin, or the like.

The cleaning composition may contain at least one of inorganic particles or organic particles.

In a case where the cleaning composition contains at least one of inorganic particles or organic particles, the total content of the inorganic particles and the organic particles with respect to the total mass of the cleaning composition is preferably 1.0% by mass or less, more preferably 0.1% by mass or less, and still more preferably 0.01% by mass or less. The lower limit thereof is not particularly limited, and examples thereof include 0.1 ppb by mass or more.

The inorganic particles and the organic particles contained in the cleaning composition correspond to, for example, particles such as organic solids and inorganic solids contained as impurities in raw materials, and particles such as organic solids and inorganic solids brought in as contaminants during the preparation of the cleaning composition, in which those particles are finally present as particles without being dissolved in the cleaning composition.

The content of the inorganic particles and the organic particles present in the cleaning composition can be measured in a liquid phase by using a commercially available measuring device in a light scattering type liquid particle measuring method using a laser as a light source.

Examples of a method of removing the inorganic particles and the organic particles include a purification treatment such as filtering, which will be described later.

The cleaning composition may contain an amine compound.

The amine compound is a compound which has an amino group. The amino group included in the above-described amine compound is at least one selected from the group consisting of a primary amino group ($-NH_2$), a secondary amino group (>NH), and a tertiary amino group (>N—). In a case where the amine compound has a plurality of classes of amino groups, the amine compound is classified into an amine compound having the highest amino group. Specifically, an amine compound having a primary amino group and a secondary amine group is an amine compound having a secondary amine group.

Examples of the amine compound include an aliphatic amine and an amino alcohol (an aliphatic amine having a hydroxy group). The above-described amine compound may be chain-like (linear or branched) or cyclic.

The amine compound may be used alone or in combination of two or more kinds thereof.

The cleaning composition may contain an anticorrosion agent.

Examples of the anticorrosion agent include compounds having a heteroatom, and a compound having a heterocycle (a heterocyclic compound) is preferable, and a compound having a polycyclic heterocycle is more preferable.

As the anticorrosion agent, a purine compound, an azole compound, or a reducing sulfur compound is preferable.

The anticorrosion agent is preferably a compound different from the above-described compounds which can be contained in the cleaning composition.

The anticorrosion agent may be used alone or in combination of two or more kinds thereof.

In a case where the cleaning composition contains an anticorrosion agent, a content of the anticorrosion agent with respect to the total mass of the cleaning composition is preferably 0.01% to 10.0% by mass, more preferably 1.0% to 10.0% by mass, and still more preferably 5.0% to 8.0% by mass.

The cleaning composition may contain a surfactant different from the sulfonic acid-based surfactant (hereinafter, also referred to as "other surfactants").

The other surfactants are a compound having a hydrophilic group and a hydrophobic group (lipophilic group) in one molecule, and examples thereof include a nonionic surfactant, an anionic surfactant, a cationic surfactant, and an amphoteric surfactant.

In a case where the cleaning composition contains the other surfactants, anticorrosion performance of a metal film and removability of abrasive fine particles are more excellent.

Examples of the other surfactants also include compounds described in paragraphs [0092] to [0096] of JP2015-158662A, paragraphs [0045] and [0046] of JP2012-151273A, and paragraphs [0014] to [0020] of JP2009-147389A, the contents of which are incorporated herein by reference.

The other surfactants may be used alone or in combination of two or more kinds thereof.

In a case where the cleaning composition contains other surfactants, a content of the other surfactants with respect to the total mass of the cleaning composition is preferably 0.001% to 8.0% by mass, more preferably 0.005% to 5.0% by mass, and still more preferably 0.01% to 3.0% by mass.

The cleaning composition may contain a pH adjuster to adjust and maintain the pH of the cleaning composition. The cleaning composition may be adjusted to a pH range described later with the pH adjuster.

The pH adjuster is a basic compound or an acidic compound, which is different from the above-described compounds which can be contained in the cleaning composition.

Examples of the pH adjuster include a quaternary ammonium compound, a basic compound, and an acidic compound, and a quaternary ammonium compound, sulfuric acid, or potassium hydroxide is preferable.

The pH of the cleaning composition may be adjusted by adjusting the addition amount of each of the above-described components.

Examples of the pH adjuster include paragraphs and of WO2019-151141A and paragraph of WO2019-151001A, the contents of which are incorporated herein by reference.

The pH adjuster may be used alone or in combination of two or more kinds thereof.

In a case where the cleaning composition contains a pH adjuster, a content of the pH adjuster with respect to the total mass of the cleaning composition can be selected according to the types and amounts of other components, and is preferably 0.01% to 10.0% by mass, more preferably 0.05% to 5.0% by mass, and still more preferably 0.05% to 3.0% by mass.

<Properties of Cleaning Composition>

Hereinafter, the properties of the cleaning composition according to the embodiment of the present invention will be described. Specifically, pH, electrical conductivity, and coarse particles will be described.

(pH)

The pH of the cleaning composition according to the embodiment of the present invention is 0.10 to 4.00.

From the viewpoint of more excellent anticorrosion properties of copper, the pH of the cleaning composition is preferably 0.50 to 3.00, more preferably 1.00 to 2.00, and still more preferably 1.00 to 1.50.

In the present specification, the pH of the cleaning composition is determined by measuring pH at 25° C. by using a pH meter (F-51 (trade name) manufactured by HORIBA, Ltd.).

Examples of a method of adjusting the pH include a method of adjusting the type and content of each component which can be contained in the cleaning composition and a method of adding the above-described pH adjuster.

(Electrical Conductivity)

The electrical conductivity of the cleaning composition is preferably 0.05 to 11.0 mS/cm.

The electrical conductivity of the cleaning composition is more preferably 1.00 to 11.0 mS/cm and still more preferably 4.00 to 11.0 mS/cm.

In the present specification, the electrical conductivity of the cleaning composition is obtained by measuring electrical conductivity at 25° C. using an electrical conductivity meter (portable D-70/ES-70 series manufactured by HORIBA, Ltd.).

Examples of a method of adjusting the above-described electrical conductivity include a method of adjusting the type and content of each component which can be contained in the cleaning composition.

<Production of Cleaning Composition>

Hereinafter, a production of the cleaning composition according to the embodiment of the present invention will be described in detail. Specifically, a liquid preparation method, a purification treatment, a container for accommodating the cleaning composition, and a handling environment for performing the production and the like will be described in detail.

(Liquid Preparation Method)

The method for preparing a liquid of the cleaning composition is not particularly limited, and for example, the cleaning composition can be produced by mixing each of the above-described components. The order and/or timing of mixing each of the above-described components is not particularly limited. Examples thereof include a method of mixing the citric acid, the HEDPO, the sulfonic acid-based surfactant, and other components with the water and a method of mixing the water, the HEDPO, the sulfonic acid-based surfactant, and other components with a citric acid aqueous solution.

In mixing each component, each component may be mixed collectively or may be divided into a plurality of times and mixed.

As each component to be mixed, a solid may be used or an aqueous solution may be used.

A stirring device and a stirring method used for mixing the cleaning composition are not particularly limited, and known devices and methods may be used. Examples of a stirrer include an industrial mixer, a portable stirrer, a mechanical stirrer, and a magnetic stirrer.

A storage temperature of the mixing of each component in the preparation of the cleaning composition, the purification treatment described below, and the produced cleaning composition is preferably 40° C. or lower and more preferably 30° C. or lower. The lower limit of the storage temperature is not limited, but it is preferably 5° C. or higher and more preferably 10° C. or higher.

(Purification Treatment)

It is preferable to subject any one or more of the raw materials for producing the cleaning composition to a purification treatment in advance. In addition, the purification treatment may be performed on the cleaning composition produced by the above-described method. The purification treatment is not particularly limited, and examples thereof include known methods such as distillation, ion exchange, and filtration.

A degree of purification is not particularly limited, but for example, it is preferable to carry out the purification until the purity of the raw material is 99% by mass or more, and it is more preferable to carry out the purification until the purity of the raw material is 99.9% by mass or more.

Examples of a specific method of the purification treatment include a method of passing the raw material through an ion exchange resin, a reverse osmosis membrane (an RO membrane), or the like, distillation of a raw material, and filtering described later.

As the purification treatment, a plurality of the above-described purification methods may be combined and carried out. For example, the raw materials are subjected to primary purification by passing through an RO membrane, and then subjected to secondary purification by passing through a purification device consisting of a cation-exchange resin, an anion-exchange resin, or a mixed-bed type ion exchange resin.

In addition, the purification treatment may be performed a plurality of times.

The filter which is used for filtering is not particularly limited as long as it has been used in application for filtering and the like in the related art. Examples thereof include filters formed of fluorine-based resins such as polytetrafluoroethylene (PTFE) and tetrafluoroethylene perfluoroalkyl vinyl ether copolymer (PFA), polyamide-based resins such as nylon, polyolefin resins (including those with a high density and a ultra-high molecular weight) such as polyethylene and polypropylene (PP), or the like. Among these materials, a material selected from the group consisting of polyethylene, polypropylene (including a high-density polypropylene), fluorine-based resin (including PTFE and PFA), and a polyamide-based resin (including nylon) is preferable, and a filter of the fluorine-based resin is more preferable. By carrying out filtering of the raw materials using a filter formed of these materials, high-polarity foreign matters which are likely to cause defects can be more effectively removed.

A critical surface tension of the filter is preferably 70 to 95 mN/m and more preferably 75 to 85 mN/m. The value of the critical surface tension of the filter is a nominal value of a manufacturer. In a case of using a filter having a critical surface tension in the above-described range, it is possible to effectively remove high-polarity foreign matters which are likely to cause defects.

A pore diameter of the filter is preferably 2 to 20 nm and more preferably 2 to 15 nm. By adjusting the pore diameter of the filter to be within the above-described range, it is possible to reliably remove fine foreign matters such as impurities and aggregates contained in the raw materials while suppressing clogging in filtering. With regard to the pore diameter of the filter herein, a nominal value of the filter manufacturer can be referred to.

The filtering may be carried out only once or twice or more. In a case where the filtering is carried out twice or more, the filters used may be the same or different from each other.

In addition, a temperature during the filtering is preferably room temperature (25° C.) or lower, more preferably 23° C. or lower, and still more preferably 20° C. or lower. The lower limit of the temperature is preferably 0° C. or higher, more preferably 5° C. or higher, and still more preferably 10° C. or higher. In a case of carrying out the filtering in the above-described temperature range, it is possible to reduce the amounts of particulate foreign matter and impurities dissolved in the raw material and to efficiently remove the foreign matter and impurities.

(Container)

The cleaning composition (including an aspect of a diluted cleaning composition described later) can be packed in any container, stored, transported, and used as long as corrosiveness or the like does not become a problem.

In application for a semiconductor, the container is preferably a container which has a high degree of cleanliness inside the container and in which the elution of impurities from an inner wall of an accommodating portion of the container into the cleaning composition is suppressed. Examples of such a container include various containers commercially available as a container for a semiconductor cleaning composition. Examples of the commercially available container include, but are not limited to, “CLEAN BOTTLE” series (manufactured by Aicello Chemical Co., Ltd.) and “PURE BOTTLE” (manufactured by Kodama Plastics Co., Ltd.).

In the container for accommodating the cleaning composition, a liquid contact portion with the cleaning composition, such as the inner wall of the accommodating portion, is formed of a fluorine-based resin (perfluororesin), but it is preferably formed of a metal which has undergone rust prevention treatment and/or metal elution prevention treatment.

The inner wall of the container is preferably formed of a resin or a metal which has been subjected to rust-preventing and metal elution-preventing treatments. Examples of the resin include one or more resins selected from the group consisting of a polyethylene resin, a polypropylene resin, and a polyethylene-polypropylene resin, and a resin other than the resins, which will be described below. Examples of the metal which has been subjected to rust-preventing and metal elution-preventing treatments include stainless steel, HASTELLOY, Inconel, and Monel.

As the above-described other resins, a fluorine-based resin (perfluororesin) is preferable. In a case where a container having an inner wall formed of a fluorine-based resin is used, occurrence of problems such as elution of an ethylene or propylene oligomer can be further suppressed than in a case where a container having an inner wall formed of a polyethylene resin, a polypropylene resin, or a polyethylene-polypropylene resin is used.

Specific examples of such a container having an inner wall formed of a fluorine-based resin include a FluoroPure PFA composite drum manufactured by Entegris. In addition, containers described in page 4 of JP1991-502677A (JP-H3-502677A), in page 3 of WO2004/016526A, in pages 9 and 16 of WO99/46309A, or the like can also be used.

In addition, for the inner wall of the container, other than the above-described fluorine-based resin, quartz and an electropolished metal material (that is, an electropolished metal material) are also preferably used.

The metal material which is used for producing the above-described electropolished metal material is preferably a metal material which includes at least one selected from the group consisting of chromium and nickel, and has a total content of chromium and nickel of more than 25% by mass with respect to the total mass of the metal material, and examples thereof include stainless steel and a nickel-chromium alloy.

The total content of chromium and nickel in the metal material is more preferably 30% by mass or more with respect to the total mass of the metal material.

The upper limit value of the total content of chromium and nickel in the metal material is not particularly limited, but it is preferably 90% by mass or less.

A method for electropolishing the metal material is not particularly limited, and a known method can be used. For example, methods described in paragraphs to of JP2015-227501A, paragraphs to of JP2008-264929A, or the like can be used.

The inside of these containers is preferably cleaned before filling the cleaning composition. With regard to a liquid used for the cleaning, the amount of metal impurities in the liquid is preferably reduced. The cleaning composition may be bottled in a container such as a gallon bottle and a coated bottle after the production, and then may be transported and stored.

In order to prevent changes in the components of the cleaning composition during the storage, the inside of the container may be purged with an inert gas (such as nitrogen and argon) having a purity of 99.99995% by volume or more. In particular, a gas with a low moisture content is preferable. In addition, during the transportation and the storage, the temperature may be controlled to a normal temperature or may be controlled in a range of −20° C. to 20° C. to prevent deterioration.

A proportion of a void volume other than the cleaning composition in the container, that is, a void ratio of the container is preferably 1% to 30% by mass, more preferably 3% to 20% by mass, and still more preferably 5% to 15% by mass.

(Handling Environment)

It is preferable that the handling including the production of the cleaning composition, the opening and cleaning of the container, the filling of the cleaning composition, and the like, a treatment analysis, and a measurement are all carried out in a clean room. It is preferable that the clean room meets the 14644-1 clean room standard. The clean room preferably satisfies any of International Organization for Standardization (ISO) class 1, ISO class 2, ISO class 3, or ISO class 4, more preferably ISO class 1 or ISO class 2, and still more preferably ISO class 1.

<Use of Cleaning Composition and Cleaning Method>

An application of the cleaning composition, an object to be cleaned, a cleaning method, and a method of using the cleaning composition will be described in detail below.

(Application of Cleaning Composition)

The cleaning composition is preferably used in a step of cleaning a semiconductor substrate in a process of manufacturing a semiconductor substrate. Among these, the cleaning composition is preferably used in a cleaning step of cleaning a semiconductor substrate which has been subjected to a chemical mechanical polishing (CMP) treatment. In addition, the cleaning composition can also be used for a buffing treatment as described later. In addition, the cleaning composition can be used for cleaning an apparatus or the like used in the process for manufacturing a semiconductor substrate.

As will be described later, a diluted cleaning composition obtained by diluting the cleaning composition may be used for cleaning the semiconductor substrate.

Hereinafter, the object to be cleaned, in which the cleaning composition is preferably used, will be described in detail.

(Object to be Cleaned)

Examples of the object to be cleaned with the cleaning composition include a semiconductor substrate (more specifically, a semiconductor substrate having a metal-containing substance).

The object to be cleaned is preferably a semiconductor substrate having a metal-containing substance after a CMP treatment described later, or a semiconductor substrate having a metal-containing substance, which has been subjected to a buffing after the CMP treatment.

Examples of the metal contained in the metal-containing substance include at least one metal M selected from the group consisting of copper (Cu), cobalt (Co), tungsten (W), molybdenum (Mo), ruthenium (Ru), aluminum (Al), titanium (Ti), tantalum (Ta), chromium (Cr), hafnium (Hf), osmium (Os), platinum (Pt), nickel (Ni), manganese (Mn), zirconium (Zr), palladium (Pd), lanthanum (La), and iridium (Ir).

The metal-containing substance may be any substance containing a metal (a metal atom), and examples thereof include a single body of the metal M, an alloy containing the metal M, an oxide of the metal M, a nitride of the metal M, and an oxynitride of the metal M.

The metal-containing substance may be a mixture containing two or more of these compounds.

The oxide, the nitride, and the oxynitride described above may be respectively any of a composite oxide, a composite nitride, and a composite oxynitride, which contain the metal.

A content of the metal atom in the metal-containing substance is preferably 10% by mass or more, more preferably 30% by mass or more, and still more preferably 50% by mass or more with respect to the total mass of the metal-containing substance. The upper limit thereof is preferably 100% by mass or less because the metal-containing substance may be the metal itself.

The semiconductor substrate preferably has the metal-containing substance containing the metal M, more preferably has a metal-containing substance containing at least one metal selected from the group consisting of Cu, Co, W, Mo, Ru, Al, Ti, and Ta, still more preferably has a metal-containing substance containing at least one metal selected from the group consisting of Cu, Co, W, Mo, and Ru, and particularly preferably has a metal-containing substance containing Cu.

Examples of the semiconductor substrate, which is the object to be cleaned with the cleaning composition, include a substrate having a metal wiring line film, a barrier metal, and an insulating film on a surface of a wafer constituting the semiconductor substrate.

Specific examples of the wafer constituting the semiconductor substrate include a wafer consisting of a silicon-based material, such as a silicon (Si) wafer, a silicon carbide (SiC) wafer, and a silicon-including resin-based wafer (glass epoxy wafer), a gallium phosphorus (GaP) wafer, a gallium arsenic (GaAs) wafer, and an indium phosphorus (InP) wafer.

The silicon wafer may be an n-type silicon wafer in which a silicon wafer is doped with a pentavalent atom (for example, phosphorus (P), arsenic (As), antimony (Sb), and the like), and a p-type silicon wafer in which a silicon wafer is doped with a trivalent atom (for example, boron (B), gallium (Ga), and the like). The silicon of the silicon wafer may be, for example, any one of amorphous silicon, single crystal silicon, polycrystalline silicon, and polysilicon.

The semiconductor substrate may have an insulating film on the wafer.

Specific examples of the insulating film include a silicon oxide film (for example, a silicon dioxide ($SiO_2$) film, a tetraethyl orthosilicate ($Si(OC_2H_5)_4$) film (TEOS film), and the like), a silicon nitride film (for example, silicon nitride ($Si_3N_4$), silicon nitride carbide (SiNC), and the like), and a low-dielectric-constant (Low-k) film (for example, a carbon-doped silicon oxide (SiOC) film, a silicon carbide (SiC) film, and the like). Among these, a low-dielectric-constant (Low-k) film is preferable.

The metal-containing substance is also preferably a metal film containing a metal.

The metal film included in the semiconductor substrate is preferably a metal film containing the metal M, more preferably a metal film containing at least one metal selected from the group consisting of Cu, Co, W, Mo, Ru, Al, Ti, and Ta, still more preferably a metal film containing at least one metal selected from the group consisting of Cu, Co, W, Mo, and Ru, and particularly preferably a metal film containing Cu.

Examples of the metal film containing at least one metal selected from the group consisting of Cu, Co, W, Mo, and Ru include a film containing Cu as a main component (a Cu-containing film), a film containing Co as a main component (a Co-containing film), a film containing W as a main component (a W-containing film), a film containing Mo as a main component (a Mo-containing film), and a film containing Ru as a main component (a Ru-containing film).

Examples of the Cu-containing film include a wiring line film consisting of only metal Cu (Cu wiring line film) and a wiring line film made of an alloy consisting of metal Cu and another metal (Cu alloy wiring line film).

Specific examples of the Cu alloy wiring line film include a wiring line film made of an alloy consisting of one or more metals selected from Al, Ti, Cr, Mn, Ta, and W, and Cu. More specific examples thereof include a CuAl alloy wiring line film, a CuTi alloy wiring line film, a CuCr alloy wiring line film, a CuMn alloy wiring line film, a CuTa alloy wiring line film, and a CuW alloy wiring line film.

Examples of the Co-containing film include a metal film consisting of only metal Co (Co metal film) and a metal film made of an alloy consisting of metal Co and another metal (Co alloy metal film).

Examples of the Co alloy metal film include a metal film made of an alloy consisting of one or more metals selected from Ti, Cr, Fe, Ni, Mo, Pd, Ta, and W, and Co. More specific examples thereof include a CoTi alloy metal film, a CoCr alloy metal film, a CoFe alloy metal film, a CoNi alloy metal film, a CoMo alloy metal film, a CoPd alloy metal film, a CoTa alloy metal film, and a CoW alloy metal film.

Among the Co-containing films, the Co metal film is often used as the wiring line film, and the Co alloy metal film is often used as the barrier metal.

Examples of the W-containing film (metal film containing W as a main component) include a metal film consisting of only W (W metal film) and a metal film made of an alloy consisting of W and another metal (W alloy metal film).

Examples of the W alloy metal film include a WTi alloy metal film and a WCo alloy metal film.

The W-containing film is used, for example, as a barrier metal or a connecting part between a via and a wiring line.

Examples of the Mo-containing film include a metal film consisting of only metal Mo (Mo metal film) and a metal film made of an alloy consisting of metal Mo and another metal (Mo alloy metal film).

Examples of the Ru-containing film include a metal film consisting of only metal Ru (Ru metal film) and a metal film made of an alloy consisting of metal Ru and another metal (Ru alloy metal film). The Ru-containing film is often used as a barrier metal.

In addition, the cleaning composition may be preferably used for cleaning a substrate that has, on a wafer constituting a semiconductor substrate, the Cu-containing wiring line film and a metal film (a Co barrier metal) which is composed of only metal Co and is a barrier metal of the Cu-containing wiring line film, where the Cu-containing wiring line film is in contact with the Co barrier metal on the surface of the substrate.

Methods for forming the above-described insulating film, Cu-containing film, Co-containing film, W-containing film, and Mo-containing film on the wafer constituting the semiconductor substrate are not particularly limited as long as they are methods which are generally carried out in this field.

Examples of a method of forming the insulating film include a method in which the wafer constituting a semiconductor substrate is subjected to a heat treatment in the presence of oxygen gas to form a silicon oxide film, and then a gas of silane and ammonia is introduced thereto to form a silicon nitride film by a chemical vapor deposition (CVD) method.

Examples of a method of forming the Cu-containing film, the Co-containing film, the W-containing film, the Mo-containing film, and the Ru-containing include a method of forming a circuit on a wafer having the above-described insulating film by a known method using a means such as a resist, and then forming a Cu-containing film, a Co-containing film, a W-containing film, a Mo-containing film, and a Ru-containing film according to a method such as plating and a CVD method.

—CMP Treatment—

As the object to be cleaned with the cleaning composition, a semiconductor substrate having a metal film after a CMP treatment is preferable.

The CMP treatment is a treatment in which a surface of a substrate having the metal wiring line film, the barrier metal, and the insulating film is flattened by a combined action of a chemical action and a mechanical polishing using a polishing slurry including polishing fine particles (abrasive grains).

A surface of the semiconductor substrate, which has been subjected to the CMP treatment, may have impurities remaining thereon, such as abrasive grains (for example, silica, alumina, and the like) used in the CMP treatment, a polished metal wiring line film, and metal impurities (metal residue; in particular, Cu-containing metal residue) derived from the barrier metal. In addition, an organic residue derived from a CMP treatment liquid used in the CMP treatment may remain. For example, since these impurities may cause a short-circuit between wiring lines and deteriorate electrical characteristics of the semiconductor substrate, the semiconductor substrate which has been subjected to the CMP treatment is subjected to a cleaning treatment for removing these impurities from the surface.

Specific examples of the semiconductor substrate which has been subjected to the CMP treatment include substrates which have been subjected to the CMP treatment, described in Journal of the Japan Society for Precision Engineering, Vol. 84, No. 3, 2018, but the present invention is not limited thereto.

—Buffing Treatment—

The surface of the semiconductor substrate which is the object to be cleaned with the cleaning composition may be subjected to the CMP treatment and then to a buffing treatment.

The buffing treatment is a treatment of reducing impurities on the surface of the semiconductor substrate using a polishing pad. Specifically, the surface of the semiconductor substrate which has been subjected to the CMP treatment is brought into contact with the polishing pad, and the semiconductor substrate and the polishing pad are relatively slid while supplying a composition for the buffing treatment to a contact portion. As a result, impurities on the surface of the semiconductor substrate are removed by a frictional force of the polishing pad and a chemical action of a composition for the buffing treatment.

As the composition for the buffing treatment, a known composition for the buffing treatment can be appropriately used depending on the type of the semiconductor substrate, and the type and amount of the impurities to be removed. Components contained in the composition for a buffing treatment are not particularly limited, and examples thereof include a water-soluble polymer such as polyvinyl alcohol, water as a dispersion medium, and an acid such as nitric acid.

A polishing device, polishing conditions, and the like, which are used in the buffing treatment, can be appropriately selected from known devices and conditions according to the type of the semiconductor substrate, the object to be removed, and the like. Examples of the buffing treatment include treatments described in paragraphs to of WO2017/169539A, the contents of which are incorporated herein by reference.

In addition, in one embodiment of the buffing treatment, it is preferable that the semiconductor substrate is buffed using the above-described cleaning composition as the composition for the buffing treatment. That is, it is also preferable that the semiconductor substrate having the metal film after the CMP treatment is used as the object to be cleaned, and the cleaning composition is used for the buffing.

(Cleaning Method)

Hereinafter, a cleaning method of the semiconductor substrate using the cleaning composition will be described. As one aspect of the cleaning method, a cleaning method of the semiconductor substrate after the CMP treatment will be described.

The cleaning method is not limited to aspects described below, and may be carried out by, for example, an appropriate method depending on the above-described application.

The cleaning method using the cleaning composition is not particularly limited as long as it includes a cleaning step of cleaning the semiconductor substrate which has been subjected to the CMP treatment. The cleaning method of the semiconductor substrate preferably includes a step of applying a diluted cleaning composition obtained in a diluting step described later to the semiconductor substrate which has been subjected to the CMP treatment to carry out cleaning.

The cleaning step of cleaning the semiconductor substrate using the cleaning composition is not particularly limited as long as it is a known method to be carried out on the semiconductor substrate which has been subjected to the CMP treatment. A method commonly used in this field, such as scrub cleaning in which a cleaning member such as a brush is physically brought into contact with a surface of the semiconductor substrate while supplying the cleaning composition to the semiconductor substrate, thereby removing residues; an immersion method in which the semiconductor substrate is immersed in the cleaning composition; a spinning (dropping) method in which the cleaning composition is dropped while rotating the semiconductor substrate; and a spray method in which the cleaning composition is sprayed, may be adopted as appropriate. In the immersion type cleaning, from the viewpoint that impurities remaining on the surface of the semiconductor substrate can be further reduced, it is preferable to subject the cleaning composition in which the semiconductor substrate has been immersed to an ultrasonic treatment.

The above-described cleaning step may be carried out only once or twice or more. In a case of carrying out the cleaning two or more times, the same method may be repeated or different methods may be combined.

As the cleaning method of the semiconductor substrate, a single-wafer method or a batch method may be adopted. The single-wafer method is generally a method of treating semiconductor substrates one by one, and the batch method is generally a method of treating a plurality of semiconductor substrates at the same time.

A temperature of the cleaning composition which is used for cleaning the semiconductor substrate is not particularly limited as long as it is a temperature which is usually used in this field. Generally, the cleaning is carried out at room temperature (approximately 25° C.), but any temperature can be selected in order to improve cleanability and suppress damage to the member. For example, the temperature of the cleaning composition is preferably 10° C. to 60° C., and more preferably 15° C. to 50° C.

A cleaning time in the cleaning of the semiconductor substrate is not particularly limited, but from the viewpoint of practical use, it is preferably 10 seconds to 2 minutes, more preferably 20 seconds to 1 minute 30 seconds, and still more preferably 30 seconds to 1 minute.

A supply amount (supply rate) of the cleaning composition in the cleaning step of the semiconductor substrate is not particularly limited, but it is preferably 50 to 5,000 mL/min and more preferably 500 to 2,000 mL/min.

In the cleaning of the semiconductor substrate, a mechanical stirring method may be used in order to further improve cleaning ability of the cleaning composition.

Examples of the mechanical stifling method include a method of circulating the cleaning composition on the semiconductor substrate, a method of flowing or spraying the cleaning composition on the semiconductor substrate, and a method of stirring the cleaning composition with ultrasonic or megasonic.

After the above-described cleaning of the semiconductor substrate, a step of rinsing and washing the semiconductor substrate with a solvent (hereinafter, referred to as "rinsing step") may be carried out.

The rinsing step is preferably a step which is carried out continuously subsequently after the cleaning step of the semiconductor substrate, in which the rinsing is carried out with a rinsing solvent (rinsing liquid) over 5 seconds to 5 minutes. The rinsing step may be carried out using the above-described mechanical stifling method.

Examples of the rinsing liquid include water (preferably deionized water), methanol, ethanol, isopropyl alcohol, N-methylpyrrolidinone, γ-butyrolactone, dimethyl sulfoxide, ethyl lactate, and propylene glycol monomethyl ether acetate. In addition, an aqueous rinsing liquid having a pH of more than 8.0 (aqueous ammonium hydroxide which has been diluted, or the like) may be used.

As a method of bringing the rinsing liquid into contact with the semiconductor substrate, the above-described method of bringing the cleaning composition into contact with the semiconductor substrate can be similarly adopted.

In addition, after the above-described rinsing step, a drying step of drying the semiconductor substrate may be carried out.

Examples of the drying method include, but not limited to, a spin drying method, examples of the drying method include a spin drying method, a method of flowing a dry gas onto a semiconductor substrate, a method of heating a substrate by a heating means such as a hot plate and an infrared lamp, a Marangoni drying method, a Rotagoni drying method, an isopropyl alcohol (IPA) drying method, and any combinations thereof.

(Method of Use)

The above-described cleaning composition may be used for cleaning the semiconductor substrate as a cleaning composition (diluted cleaning composition) which has been diluted with a diluent such as water.

The diluted cleaning composition is also a form of the cleaning composition according to the embodiment of the present invention as long as the requirements of the present invention are satisfied.

A dilution ratio of the diluted cleaning composition may be appropriately adjusted according to the type and content of each component, the semiconductor substrate to be cleaned, and the like. A ratio (dilution ratio) of the diluted cleaning composition to the cleaning composition before the dilution in terms of mass ratio or volume ratio (volume ratio at 23° C.) is preferably 10 to 10,000 times, more preferably 20 to 3,000 times, and still more preferably 50 to 1,000 times.

In addition, from the viewpoint that defects can be suppressed, the cleaning composition is preferably diluted with water.

That is, it is also possible suitably put into practical use a cleaning composition (diluted cleaning composition) containing each component in an amount obtained by dividing a suitable content of each component (excluding water) contained in the above-described cleaning composition by the dilution ratio (for example, 100) in the above-described range.

In other words, the suitable content of each component (excluding water) with respect to the total mass of the diluted cleaning composition is an amount obtained, for example, by dividing the amount described as a suitable content of each component with respect to the total mass of the cleaning composition (cleaning composition before the dilution) by the dilution ratio (for example, 100) in the above-described range.

A specific method for the diluting step of diluting the cleaning composition may be carried out according to the above-described liquid preparation step of the cleaning composition. Regarding the stirring device and the stirring method as well, which are used in the diluting step, the known stifling device mentioned in the above-described liquid preparation method of the cleaning composition may be used.

It is preferable to subject the water which is used in the diluting step to a purification treatment in advance. In addition, it is preferable to subject the diluted cleaning composition obtained by diluting to a purification treatment.

Examples of the purification treatment include the ion component reducing treatment using an ion exchange resin or an RO membrane, and the foreign matter removal using filtering, which are described as the purification treatment above. Among these, it is preferable to carry out any one of these treatments.

The cleaning method of cleaning the semiconductor substrate using the cleaning composition according to the embodiment of the present invention can be suitably used in a case of manufacturing a semiconductor element. That is, the present invention also relates to a manufacturing method of a semiconductor element, including a cleaning method of cleaning a semiconductor substrate using a cleaning composition.

EXAMPLES

Hereinafter, the present invention will be described in more detail with reference to Examples.

Materials, used amounts, ratios, treatment details, treatment procedures, and the like shown in the following Examples can be appropriately changed within a range not departing from the scope of the present invention. Therefore, the scope of the present invention should not be construed as being limited to Examples shown below.

<Production of Cleaning Composition>

For Example 101, citric acid, HEDPO, a sulfonic acid-based surfactant, and water were mixed so as to have contents shown in Table 1 to prepare a mixed solution, and the mixed solution was thoroughly stirred with a stirrer to obtain a cleaning composition of Example 101. As the sulfonic acid-based surfactant, respective surfactants were mixed at proportions shown in Table 1 so as to have the contents shown in Table 1.

Compositions of Examples 102 to 121, compositions of Examples 201 to 204, and compositions Comparative Examples 1 to 4 were produced by the same procedure as in Example 101, except that the type and amount of each component were changed according to Table 1 or 2.

After the production, a filtration treatment was repeated on the composition so that a copper ion concentration contained in the composition was 0.2 ppb by mass with respect to the total mass of the composition and a phosphate ion concentration contained in the composition was 0.001% by mass with respect to the total mass of the composition. The copper ion concentration was confirmed by ICP-MS (Agilent 8800 triple quadrupole ICP-MS (for semiconductor analysis, option #200)). Specifically, as a sample introduction system, a quartz torch, a coaxial PFA nebulizer (for self-suction), and a platinum interface cone were used. Measurement parameters of cool plasma conditions were as follows.

Radio frequency (RF) output (W): 600

Carrier gas flow rate (L/min): 0.7

Makeup gas flow rate (L/min): 1

Sampling depth (mm): 18

In addition, the content of the phosphate ion was measured by ion exchange chromatography (IEC).

In addition, in the production of the cleaning compositions of Examples and Comparative Examples, handling of a container, and preparation, filling, storage, and analytical measurement of the cleaning composition were all carried out in a clean room satisfying a level of ISO Class 2 or lower.

<Components>

Hereinafter, each component used in the preparation of each composition will be shown.

(Citric Acid)

30% by Mass Citric Acid Aqueous Solution

The content of the citric acid shown in Tables 1 and 2 is the content of citric acid itself with respect to the total mass of the cleaning composition, and water of the aqueous solution is not included in the content of the citric acid.

(HEDPO)

60% by Mass 1-hydroxyethane-1,1-diphosphonic Acid Aqueous Solution

The content of the HEDPO shown in Tables 1 and 2 is the content of HEDPO itself with respect to the total mass of the cleaning composition, and water of the aqueous solution is not included in the content of the HEDPO.

(Sulfonic Acid-Based Surfactant)

LAS-10: sulfonic acid A

LAS-11: sulfonic acid B

LAS-12: sulfonic acid C

LAS-13: sulfonic acid D

ANS-11: ANS

Sulfonic acid A

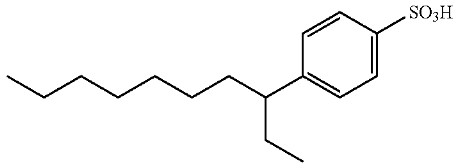

Sulfonic acid B

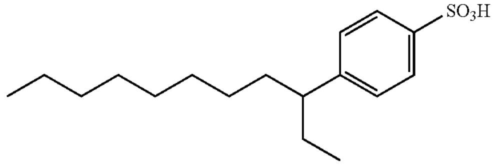

-continued

Sulfonic acid C

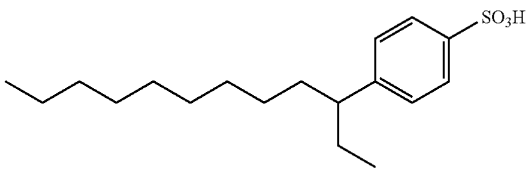

Sulfonic acid D

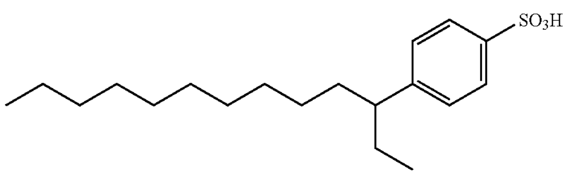

ANS

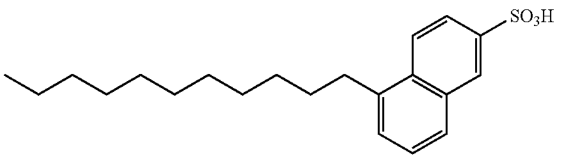

(Water)

Ultrapure Water

<Evaluation>

Various evaluation methods will be described in detail below.

(pH)

The pH of the cleaning composition was measured at 25° C. using a pH meter (F-51 (trade name) manufactured by HORIBA, Ltd.).

(Electrical Conductivity)

The electrical conductivity of the cleaning composition was measured at 25° C. using an electrical conductivity meter (portable D-70/ES-70 series manufactured by HORIBA, Ltd.).

(Residue Removability)

A cleaning performance (residue removability) in a case where a metal film subjected to a chemical mechanical polishing (CMP) treatment was cleaned using the cleaning composition produced above was evaluated. The residue removability was evaluated according to the following procedure.

First, a CMP-treated semiconductor substrate which was an object to be cleaned was prepared. Specifically, a semiconductor substrate after the CMP treatment was prepared according to the following procedure.

A wafer (diameter: 8 inches) having a metal film made of copper on a surface was polished using FREX300S-II (polishing device, manufactured by Ebara Corporation). The polishing was performed using CSL9044C and BSL8176C (trade names, both manufactured by FUJIFILM Planar Solutions L.L.C.) as polishing liquids. As a result, variations in the evaluation of cleaning performance due to the polishing liquid were suppressed. In the CMP treatment for the wafer having each of the metal films on the surface, the polishing pressure was set to 2.0 psi and the supply rate of the polishing liquid was set to 0.28 mL/(min·$cm^2$). The polishing time was 60 seconds.

Thereafter, the CMP-treated wafer was scrub-cleaned for 30 seconds using the cleaning composition of each of Examples and Comparative Examples, in which the temperature was adjusted to room temperature (23° C.).

For the dried wafer, using a defect detection device (manufactured by AMAT, ComPlus-II), the number of detected signal intensities corresponding to defects with a length of 0.1 μm or more was counted on the polished surface of the wafer, and the residue removability of the cleaning composition was evaluated according to the following evaluation standard. The results are shown in Tables 1 and 2.

It can be evaluated that, as the number of defects due to the residue detected on the polished surface of the wafer was smaller, the residue removability was excellent. The residue removability is preferably 3 or more in practical use.

The residue removability was evaluated according to the following standard.

8: the number of defects per wafer was less than 280.

7: the number of defects per wafer was 280 or more and less than 320.

6: the number of defects per wafer was 320 or more and less than 360.

5: the number of defects per wafer was 360 or more and less than 400.

4: the number of defects per wafer was 400 or more and less than 440.

3: the number of defects per wafer was 440 or more and less than 480.

2: the number of defects per wafer was 480 or more and less than 500.

1: the number of defects per wafer was 500 or more.

(Copper Anticorrosion Properties)

A wafer (diameter: 12 inches) having a metal film made of copper on a surface was cut to prepare each 2 cm wafer coupon. The thickness of the metal film was 200 nm.

The wafer coupon was immersed in the cleaning composition of each of Examples and Comparative Examples (temperature: 23° C.), and an immersion treatment was performed for 3 minutes with a stifling rotation speed of a stirrer of 250 rpm. Before and after the immersion treatment, a content of copper in the cleaning composition was measured by ICP-MS (Agilent 8800 triple quadrupole ICP-MS (for semiconductor analysis, option #200)). Detailed measurement conditions were the same as those for the measurement of copper ions in the cleaning composition described above.

From the obtained measurement results, a corrosion rate per unit time (unit: Å/min) was calculated. The copper anticorrosion properties of the cleaning composition were evaluated according to the following evaluation standard. The results are shown in Tables 1 and 2.

As the corrosion rate was lower, the corrosion prevention performance of the cleaning composition was excellent. The copper anticorrosion properties are preferably 4 or more in practical use.

8: the corrosion rate was less than 1.1 Å/min.

7: the corrosion rate was 1.1 Å/min or more and less than 1.4 Å/min.

6: the corrosion rate was 1.4 Å/min or more and less than 1.7 Å/min.

5: the corrosion rate was 1.7 Å/min or more and less than 2.0 Å/min.

4: the corrosion rate was 2.0 Å/min or more and less than 2.3 Å/min.

3: the corrosion rate was 2.3 Å/min or more and less than 2.6 Å/min.

2: the corrosion rate was 2.6 Å/min or more and less than 3.0 Å/min.

1: the corrosion rate was 3.0 Å/min or more.

In the tables, each notation is as follows.

In Tables 1 and 2, the description of "Remainder" in the column of "Water" indicates that a necessary amount of water was used so that the total amount of each component contained in each composition described in Tables was 100% by mass.

In Tables 1 and 2, the column of "Citric acid (A) wt %" indicates the content (% by mass) of citric acid with respect to the total mass of the cleaning composition; the column of "HEDPO (B) wt %" indicates the content (% by mass) of HEDPO with respect to the total mass of the cleaning composition; and the column of "Content (wt %)" in the column of "Sulfonic acid-based surfactant (C)" indicates the content (% by mass) of the sulfonic acid-based surfactant with respect to the total mass of the cleaning composition.

In Table 1, the column of "LAS-10 (wt %)" in the column of "Ratio" of the column of "Sulfonic acid-based surfactant (C)" indicates the content (% by mass) of LAS-10 with respect to the total mass of the sulfonic acid-based surfactants (sulfonic acids A to D); the column of "LAS-11 (wt %)" indicates the content (% by mass) of LAS-11 with respect to the total mass of the sulfonic acid-based surfactants (sulfonic acids A to D); the column of "LAS-12 (wt %)" indicates the content (% by mass) of LAS-12 with respect to the total mass of the sulfonic acid-based surfactants (sulfonic acids A to D); and the column of "LAS-13 (wt %)" indicates the content (% by mass) of LAS-13 with respect to the total mass of the sulfonic acid-based surfactants (sulfonic acids A to D).

In Tables 1 and 2, the notation "A/B" indicates the mass ratio of the content of citric acid to the content of HEDPO in the cleaning composition.

In Tables 1 and 2, the notation "A/C" indicates the mass ratio of the content of citric acid to the content of the sulfonic acid-based surfactant in the cleaning composition.

TABLE 1

| | Citric acid | HEDPO | Sulfonic acid-based surfactant (C) Ratio | | | | | | | | | Electrical conduc- | Residue | Copper anti- |
|---|---|---|---|---|---|---|---|---|---|---|---|---|---|---|
| | (A) (wt %) | (B) (wt %) | LAS-10 (wt %) | LAS-11 (wt %) | LAS-12 (wt %) | LAS-13 (wt %) | Content (wt %) | A/B | A/C | Water | pH | tivity (mS/cm) | remov-ability | corrosion properties |
| Example 101 | 30.0 | 0.20 | 10 | 35 | 30 | 25 | 0.07 | 150 | 428 | Remain-der | 1.00 | 9.87 | 3 | 8 |
| Example 102 | 30.0 | 0.25 | 10 | 35 | 30 | 25 | 0.07 | 120 | 428 | Remain-der | 1.00 | 9.89 | 4 | 8 |
| Example 103 | 30.0 | 0.35 | 10 | 35 | 30 | 25 | 0.07 | 85 | 428 | Remain-der | 1.00 | 9.92 | 5 | 8 |
| Example 104 | 30.0 | 0.45 | 10 | 35 | 30 | 25 | 0.07 | 66 | 428 | Remain-der | 1.00 | 9.95 | 6 | 8 |
| Example 105 | 30.0 | 0.55 | 10 | 35 | 30 | 25 | 0.07 | 54 | 428 | Remain-der | 1.00 | 9.99 | 8 | 8 |
| Example 106 | 30.0 | 0.70 | 10 | 35 | 30 | 25 | 0.07 | 42 | 428 | Remain-der | 1.00 | 10.03 | 7 | 7 |
| Example 107 | 30.0 | 0.90 | 10 | 35 | 30 | 25 | 0.07 | 33 | 428 | Remain-der | 1.00 | 10.10 | 7 | 6 |
| Example 108 | 30.0 | 1.10 | 10 | 35 | 30 | 25 | 0.07 | 27 | 428 | Remain-der | 1.00 | 10.16 | 7 | 5 |
| Example 109 | 30.0 | 1.40 | 10 | 35 | 30 | 25 | 0.07 | 21 | 428 | Remain-der | 1.00 | 10.26 | 7 | 4 |
| Example 110 | 30.0 | 0.55 | 10 | 35 | 30 | 25 | 0.06 | 54 | 500 | Remain-der | 1.00 | 9.98 | 7 | 7 |
| Example 111 | 30.0 | 0.55 | 10 | 35 | 30 | 25 | 0.05 | 54 | 600 | Remain-der | 1.00 | 9.98 | 7 | 6 |
| Example 112 | 30.0 | 0.55 | 10 | 35 | 30 | 25 | 0.04 | 54 | 750 | Remain-der | 1.00 | 9.98 | 7 | 5 |
| Example 113 | 30.0 | 0.55 | 10 | 35 | 30 | 25 | 0.03 | 54 | 1000 | Remain-der | 1.00 | 9.97 | 7 | 4 |
| Example 114 | 30.0 | 0.55 | 10 | 35 | 30 | 25 | 0.10 | 54 | 300 | Remain-der | 1.00 | 9.99 | 7 | 7 |
| Example 115 | 30.0 | 0.55 | 10 | 35 | 30 | 25 | 0.40 | 54 | 75 | Remain-der | 1.00 | 10.09 | 6 | 7 |
| Example 116 | 30.0 | 0.55 | 10 | 35 | 30 | 25 | 0.42 | 54 | 71 | Remain-der | 1.00 | 10.22 | 6 | 7 |
| Example 117 | 15.0 | 0.27 | 10 | 35 | 30 | 25 | 0.03 | 55 | 500 | Remain-der | 1.69 | 4.99 | 6 | 7 |
| Example 118 | 7.0 | 0.14 | 10 | 35 | 30 | 25 | 0.02 | 50 | 350 | Remain-der | 1.71 | 2.33 | 6 | 6 |
| Example 119 | 3.0 | 0.06 | 10 | 35 | 30 | 25 | 0.01 | 50 | 300 | Remain-der | 1.77 | 1.02 | 6 | 6 |
| Example 120 | 1.0 | 0.02 | 10 | 35 | 30 | 25 | 0.01 | 50 | 200 | Remain-der | 1.96 | 0.33 | 5 | 6 |
| Example 121 | 0.3 | 0.0055 | 10 | 35 | 30 | 25 | 0.0007 | 54 | 428 | Remain-der | 2.64 | 0.09 | 4 | 5 |
| Compar-ative Example 1 | 30.0 | 0.12 | 10 | 35 | 30 | 25 | 0.07 | 250 | 428 | Remain-der | 1.00 | — | 1 | 3 |

TABLE 1-continued

| | Citric acid (A) (wt %) | HEDPO (B) (wt %) | Sulfonic acid-based surfactant (C) Ratio LAS-10 (wt %) | LAS-11 (wt %) | LAS-12 (wt %) | LAS-13 (wt %) | Content (wt %) | A/B | A/C | Water | pH | Electrical conductivity (mS/cm) | Residue removability | Copper anticorrosion properties |
|---|---|---|---|---|---|---|---|---|---|---|---|---|---|---|
| Comparative Example 2 | 30.0 | 4.00 | 10 | 35 | 30 | 25 | 0.07 | 7 | 428 | Remainder | 1.00 | — | 3 | 1 |
| Comparative Example 3 | 30.0 | 0.55 | 10 | 35 | 30 | 25 | 0.01 | 54 | 3000 | Remainder | 1.00 | — | 3 | 1 |
| Comparative Example 4 | 30.0 | 0.55 | 10 | 35 | 30 | 25 | 1.50 | 54 | 20 | Remainder | 1.00 | — | 1 | 3 |

TABLE 2

| | Citric acid (A) (wt %) | HEDPO (B) (wt %) | Sulfonic acid-based surfactant (C) Ratio LAS-10 (wt %) | LAS-11 (wt %) | LAS-12 (wt %) | ANS-11 (wt %) | Content (wt %) | A/B | A/C | Water | pH | Electrical conductivity (mS/cm) | Residue removability | Copper anticorrosion properties |
|---|---|---|---|---|---|---|---|---|---|---|---|---|---|---|
| Example 201 | 30 | 0.55 | | | 100 | | 0.07 | 54 | 428 | Remainder | 1.00 | 9.99 | 7 | 7 |
| Example 202 | 30 | 0.55 | | 100 | | | 0.07 | 54 | 428 | Remainder | 1.00 | 9.99 | 7 | 7 |
| Example 203 | 30 | 0.55 | 100 | | | | 0.07 | 54 | 428 | Remainder | 1.00 | 9.99 | 7 | 7 |
| Example 204 | 30 | 0.55 | | | | 100 | 0.07 | 54 | 428 | Remainder | 1.00 | 9.99 | 7 | 7 |

From the comparison between Examples and Comparative Examples, it was confirmed that the cleaning composition according to the embodiment of the present invention had excellent removability of residues and anticorrosion properties of copper.

From the comparison between Example 105 and Examples 201 to 204, in a case of containing ABS1 including an alkyl group having 10 carbon atoms, ABS2 including an alkyl group having 11 carbon atoms, ABS3 including an alkyl group having 12 carbon atoms, and ABS4 including an alkyl group having 13 carbon atoms, it was confirmed that the removability of residues and the anticorrosion properties of copper were more excellent.

From the results of Examples 101 to 116, in a case where the mass ratio of the content of citric acid to the content of 1-hydroxyethane-1,1-diphosphonic acid was 30 to 100, it was confirmed that at least one of the removability of residues or the anticorrosion properties of copper was more excellent.

From the results of Examples 101 to 116, in a case where the mass ratio of the content of citric acid to the content of 1-hydroxyethane-1,1-diphosphonic acid was 40 to 80, it was confirmed that at least one of the removability of residues or the anticorrosion properties of copper was more excellent.

From the results of Examples 101 to 116, in a case where the mass ratio of the content of citric acid to the content of 1-hydroxyethane-1,1-diphosphonic acid was 50 to 60, it was confirmed that at least one of the removability of residues or the anticorrosion properties of copper was more excellent.

From the results of Examples 101 to 116, in a case where the mass ratio of the content of citric acid to the content of the sulfonic acid-based surfactants was 200 to 600, it was confirmed that at least one of the removability of residues or the anticorrosion properties of copper was more excellent.

From the results of Examples 101 to 116, in a case where the mass ratio of the content of citric acid to the content of the sulfonic acid-based surfactants was 300 to 500, it was confirmed that at least one of the removability of residues or the anticorrosion properties of copper was more excellent.

From the results of Examples 101 to 116, in a case where the mass ratio of the content of citric acid to the content of the sulfonic acid-based surfactants was 410 to 440, it was confirmed that at least one of the removability of residues or the anticorrosion properties of copper was more excellent.

From the results of Examples 105 and 117 to 121, in a case where the content of citric acid with respect to the total mass of the cleaning composition was 0.1% to 35.0% by mass, it was confirmed that at least one of the removability of residues or the anticorrosion properties of copper was more excellent.

From the results of Examples 105 and 117 to 121, in a case where the content of citric acid with respect to the total mass of the cleaning composition was 1.0% to 35.0% by mass, it was confirmed that at least one of the removability of residues or the anticorrosion properties of copper was more excellent.

From the results of Examples 105 and 117 to 121, in a case where the content of citric acid with respect to the total mass of the cleaning composition was 20.0% to 35.0% by mass, it was confirmed that at least one of the removability of residues or the anticorrosion properties of copper was more excellent.

What is claimed is:

1. A cleaning composition comprising:
citric acid;
1-hydroxyethane-1,1-diphosphonic acid;
a sulfonic acid-based surfactant; and
water,
wherein a mass ratio of a content of the citric acid to a content of the 1-hydroxyethane-1,1-diphosphonic acid is 20 to 150,
a mass ratio of the content of the citric acid to a content of the sulfonic acid-based surfactant is 70 to 1,500,
a pH is 0.10 to 4.00, and
the cleaning composition comprises no organic particles.

2. The cleaning composition according to claim 1,
wherein the sulfonic acid-based surfactant comprises an alkylbenzene sulfonic acid-based surfactant.

3. The cleaning composition according to claim 2,
wherein the alkylbenzene sulfonic acid-based surfactant comprises an alkylbenzene sulfonic acid-based surfactant having an alkyl group having 8 or more carbon atoms.

4. The cleaning composition according to claim 2,
wherein the alkylbenzene sulfonic acid-based surfactant comprises an alkylbenzene sulfonic acid-based surfactant having an alkyl group having 10 to 13 carbon atoms.

5. The cleaning composition according to claim 1,
wherein the sulfonic acid-based surfactant comprises
an alkylbenzene sulfonic acid-based surfactant 1 comprising an alkyl group having 10 carbon atoms,
an alkylbenzene sulfonic acid-based surfactant 2 comprising an alkyl group having 11 carbon atoms,
an alkylbenzene sulfonic acid-based surfactant 3 comprising an alkyl group having 12 carbon atoms, and
an alkylbenzene sulfonic acid-based surfactant 4 comprising an alkyl group having 13 carbon atoms.

6. The cleaning composition according to claim 5,
wherein a content of the alkylbenzene sulfonic acid-based surfactant 2 with respect to a total mass of the alkylbenzene sulfonic acid-based surfactants 1 to 4 is 20% to 50% by mass.

7. The cleaning composition according to claim 1,
wherein the mass ratio of the content of the citric acid to the content of the 1-hydroxyethane-1,1-diphosphonic acid is 30 to 100.

8. The cleaning composition according to claim 1,
wherein the mass ratio of the content of the citric acid to the content of the 1-hydroxyethane-1,1-diphosphonic acid is 40 to 80.

9. The cleaning composition according to claim 1,
wherein the mass ratio of the content of the citric acid to the content of the 1-hydroxyethane-1,1-diphosphonic acid is 50 to 60.

10. The cleaning composition according to claim 1,
wherein the mass ratio of the content of the citric acid to the content of the sulfonic acid-based surfactant is 200 to 600.

11. The cleaning composition according to claim 1,
wherein the mass ratio of the content of the citric acid to the content of the sulfonic acid-based surfactant is 300 to 500.

12. The cleaning composition according to claim 1,
wherein the mass ratio of the content of the citric acid to the content of the sulfonic acid-based surfactant is 410 to 440.

13. The cleaning composition according to claim 1,
wherein the content of the citric acid with respect to a total mass of the cleaning composition is 0.1% to 35.0% by mass.

14. The cleaning composition according to claim 1,
wherein the content of the citric acid with respect to a total mass of the cleaning composition is 1.0% to 35.0% by mass.

15. The cleaning composition according to claim 1,
wherein the content of the citric acid with respect to a total mass of the cleaning composition is 20.0% to 35.0% by mass.

16. A cleaning method of a semiconductor substrate, comprising:
contacting a semiconductor substrate with the cleaning composition according to claim 1.

17. A manufacturing method of a semiconductor element, comprising:
the cleaning method of a semiconductor substrate according to claim 16.

18. The cleaning composition according to claim 2,
wherein the mass ratio of the content of the citric acid to the content of the 1-hydroxyethane-1,1-diphosphonic acid is 30 to 100.

19. The cleaning composition according to claim 1,
wherein an electrical conductivity of the cleaning composition is 0.05 to 11.0 mS/cm.

* * * * *